Jan. 18, 1949.   E. T. W. JAHRL   2,459,649
CHUCK
Filed June 2, 1945

ERIK TORSTEN JAHRL
INVENTOR
By Richardson and David
his ATTY.

Patented Jan. 18, 1949

2,459,649

UNITED STATES PATENT OFFICE 2,459,649

CHUCK

Erik Torsten Wilhelm Jahrl, Orebro, Sweden

Application June 2, 1945, Serial No. 597,188
In Sweden June 8, 1944

12 Claims. (Cl. 279—75)

The present invention relates to a chuck intended particularly for a quick engaging and disengaging of the tools or the like for which it is to serve as a hold.

The chuck is to its principle based on the known device of locking bodies, preferably in the form of rolls or balls which are mounted in the chuck and engage the tool.

The object of the present invention is to make the locking more reliable and quicker than has hitherto been possible. Especially, the invention permits a self-adjustment of the tool in the chuck during operation without the disengagement being rendered difficult in any way.

Figure 1:
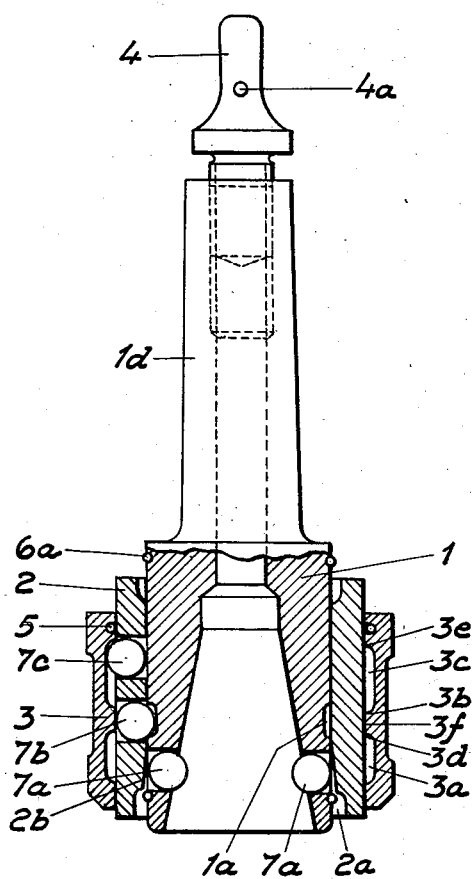
Figure 2:
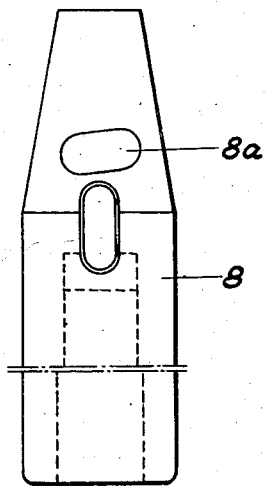

Referring to the drawing which illustrates a preferred embodiment of this invention, Fig. 1 is an axial section of the chuck;

Fig. 2 is an elevation of the end portion of a tool or the like which is to be fixed in the chuck.

The reference numeral 1 indicates the core of the chuck, 2 an innerlocking sleeve, axially displaceable on the core 1, 3 an outer locking sleeve surrounding the inner locking sleeve 2, 4 a driving tongue terminating a spindle 1d formed integral with the core 1, and 8 the upper end portion of a tool to be fixed in the chuck.

The core 1 has an inwardly conically tapering opening for the tool portion 8. A series of holes is provided through the peripheral wall of the core 1 near the open end of the core to accommodate a set of locking elements in the form of balls 7a, each of which is adapted to be brought into engagement with its individual cam groove, e. g. an inclined groove 8a in the tool portion 8. Only one of these grooves is visible in Fig. 2. The outer surfaces of the balls 7a are engaged by a conical surface 2b of the inner locking sleeve 2 when the latter is pushed downward towards the tool portion 8. The surface 2b being conical, the balls 7a tend to press the intermediate sleeve 2 upward in axial direction away from the tool portion 8. In order that the sleeve 2 shall not be displaced by the ensuing axial pressure, a set of locking bodies is provided in the form of balls (one, 7b, is visible on the drawing) which in the locking position are held pressed in a turned groove 1a of the core 1 by means of the outer locking sleeve 3.

When the sleeve 3 is manually moved upwards, the balls 7b can enter the groove 3a, so that the inner locking sleeve 2 is freed from the core 1. When the outer sleeve 3 is moved further upwards, the edge 3b of a groove 3c will meet abutments formed by balls (one, 7c, is visible on the drawing), seated in holes in the inner sleeve 2, thus causing the latter to participate in the upward movement until the sleeve 2 stops against a locking ring 6a on the core 1. In this position of the sleeves the balls 7a can roll into a recess 2a of the inner locking sleeve 2, whereby the inserted tool is disengaged.

When the tool is to be inserted in the chuck, the outer sleeve 3 is held in its upper position, the tool is pushed up in the cone of the core 1 and the outer sleeve 3 is moved downwards. The edge 3d meets the ball 7b causing the inner locking sleeve 2 to participate in the downward movement. The balls 7a are pressed into the grooves 8a of the tool 8 and, when the ball 7b has reached a position in front of the groove 1a, it is pressed into this groove, and the inner locking sleeve 2 terminates its downward movement. The sleeve 3 continues its downward movement until its edge 3e meets the ball 7c, whereupon the movement is stopped. In this position the surface 3f presses the ball 7b into the groove 1a, whereby the inner locking sleeve 2 is locked to the core 1.

In the outer sleeve 3 there is a braking ring 5 provided in a peripheral groove, in order to prevent displacement of the sleeve from its locking position due to vibrations, when the chuck is used in the horizontal position.

A hole 4a is provided in the driving tongue 4. In order to prevent the chuck from getting unintentionally loose in a drilling-machine, for example, a pin is inserted through the cotter slot of the drilling spindle into the hole 4a.

For fixing the chuck in milling machines, for example, the driving tongue 4 is screwed off, whereafter the chuck can be fixed in the milling spindle with a suitable tool.

The sleeve 3 can be retained while the chuck rotates, whereafter, by moving the sleeve 3 upwards, the tool can be replaced without stopping the machine.

Rolls or pins may be used instead of balls.

The cam groove 8a can be right threaded as well as left threaded; it can also be shaped in such a way that the tool is pressed up in the cone of the core sleeve in both directions of rotation.

Having now described my invention, what I claim as new and desire to secure by Letters Patent is:

1. A chuck comprising a core formed with an inwardly conically tapering opening for receiving the correspondingly shaped end portion of a tool to be mounted in the chuck, a series of holes through its peripheral wall and a depression in the outer surface of the latter, a set of locking elements seated in said holes and radially displaceable therein to engage with their inner ends depressions formed in the end portion of the tool, an inner locking sleeve surrounding said core and being axially displaceable thereon in one direction towards a locking position and in the opposite direction towards an unlocking position, said inner locking sleeve being provided with at least one hole therethrough located to register with said depression in the outer surface of the peripheral wall of said core when said inner locking sleeve assumes its locking position, an inner surface portion adapted to cooperate with the outer ends of said locking elements to urge the same radially inward as the inner locking sleeve is moved toward its locking position and to hold said locking elements pressed into the depressions in the end portion of the tool thereby locking the tool in the chuck while said inner locking sleeve assumes its locking position, and at least one recess in its inner wall to permit radial displacement of said locking elements in outward direction and, consequently, release of the inserted tool, when said inner locking sleeve assumes its unlocking position, a locking member seated in said hole in said inner locking sleeve and radially displaceable therein, and an outer locking sleeve surrounding said inner locking sleeve and axially displaceable thereon in said first axial direction towards and in said opposite direction away from a predetermined locking position, said outer locking sleeve having an inner surface portion adapted to cooperate with the outer end of said locking member to shift said inner sleeve from its unlocking toward its locking position when said outer sleeve is moved toward its locking position, to force said locking member into said depression in the outer wall of the core when said inner sleeve reaches its locking position and to hold said locking member pressed into said depression, thus locking said inner sleeve to said core, when said outer sleeve assumes its locking position and a recess formed in its inner surface to permit radial displacement of said locking member in outward direction to unlock said inner sleeve from said core when said outer sleeve is displaced from its locking position.

2. The combination with a chuck comprising a core formed with an inwardly conically tapering opening and a series of holes through its peripheral wall, a set of locking elements seated in said holes and radially displaceable therein, and locking means displaceable between a locking position in which said locking elements are pressed radially inwardly and an unlocking position in which said locking elements are freed for radial movement in outward direction, of a tool having a conical end portion fitting into said chuck and provided with inclined cam grooves to be engaged by the inner ends of said locking elements when said locking means assumes its locking position, said locking means including an outer sleeve, an intermediate sleeve, both of which surround the chuck, the latter sleeve being displaceable to a position in which it fixes said locking elements in locked position, and the former sleeve being displaceable to a position in which it secures the intermediate sleeve in the locking position, the inclination of said cam grooves being such that the tool is forced deeper into the chuck when a torque is applied to said tool.

3. A chuck comprising a core formed with an inwardly conically tapering opening for receiving the correspondingly shaped end portion of a tool to be mounted in the chuck, a series of holes through its peripheral wall and a depression in the outer surface of the latter, a set of locking elements seated in said holes displaceable therein to engage with their inner ends depressions formed in the end portion of the tool, an inner locking sleeve surrounding said core and being axially displaceable thereon in one direction towards a locking position and in an opposite direction towards an unlocking position, an outer locking sleeve surrounding said inner locking sleeve and axially displaceable thereon.

4. A chuck as claimed in claim 3 in which the locking elements are locking balls.

5. A chuck as claimed in claim 3 including a locking member in the inner locking sleeve.

6. A chuck as claimed in claim 3 including at least one locking ball in the inner locking sleeve.

7. A chuck as claimed in claim 3, including at least one hole in said inner locking sleeve located to register with the depression when in locked position, and a locking ball seated in the hole.

8. A chuck as claimed in claim 3, in which the inner surface portion of the inner locking sleeve is adapted to cooperate with the outer ends of the locking elements of the core to urge the same radially inward as the inner locking sleeve is moved toward its locking position and to hold said locking elements pressed into depressions in the tool to lock the tool in the chuck.

9. A chuck as claimed in claim 3 in which the surface portion of the inner sleeve is conical in shape.

10. A chuck as claimed in claim 3 including two abutments on the inner and outer sleeves for stopping movement in one direction when it reaches its locking position.

11. A chuck as claimed in claim 3 including cooperating abutments on the core and inner sleeve to stop the latter in its unlocking position.

12. A chuck as claimed in claim 3 including a friction element between said locking sleeves to prevent unintentional displacements of said outer sleeve from its locking position due to vibrations.

ERIK TORSTEN WILHELM JAHRL.

REFERENCES CITED

The following references are of record in the file of this patent:

UNITED STATES PATENTS

| Number | Name | Date |
| --- | --- | --- |
| 13,724 | Lindberg | May 12, 1914 |
| 1,353,299 | Wilson | Sept. 21, 1920 |
| 1,636,421 | Knott | July 19, 1927 |

FOREIGN PATENTS

| Number | Country | Date |
| --- | --- | --- |
| 353,045 | Germany | July 22, 1920 |